United States Patent [19]

Leonhart et al.

[11] Patent Number: 5,394,220
[45] Date of Patent: Feb. 28, 1995

[54] VACUUM BLANKET FOR PIN REGISTRATION

[75] Inventors: Charles J. Leonhart, Schaumburg; William R. Walters, Union, both of Ill.

[73] Assignee: nuArc Company, Inc., Niles, Ill.

[21] Appl. No.: 144,679

[22] Filed: Oct. 28, 1993

[51] Int. Cl.6 .............................. G03B 27/20
[52] U.S. Cl. .......................... 355/92; 355/99
[58] Field of Search ............... 355/87, 91–94, 355/99; 33/621

[56] References Cited

U.S. PATENT DOCUMENTS

| | | | |
|---|---|---|---|
| 4,082,454 | 4/1978 | Putnam | 355/99 |
| 4,935,773 | 6/1990 | Meacham | 355/92 |
| 4,967,230 | 10/1990 | Meacham | 355/91 |
| 4,977,683 | 12/1990 | Harder | 33/621 |
| 5,017,960 | 5/1991 | Tuulse | 355/91 |
| 5,072,257 | 12/1991 | Stoesser et al. | 355/93 |
| 5,300,973 | 4/1994 | Ternes et al. | 355/91 |

Primary Examiner—Richard A. Wintercorn
Attorney, Agent, or Firm—Mason, Kolehmainen, Rathburn & Wyss

[57] ABSTRACT

A vacuum blanket apparatus for maintaining precise registration between an image forming sheet and a light sensitive sheet when subjected to controlled exposure to light passing through a glass panel includes a vacuum blanket having an upper cover of flexible sheet material adapted to contact the light sensitive sheet for biasing the same and said image sheet toward a planar face of the glass panel when the panel is locked in position parallel to the vacuum blanket. The blanket cover is formed with at least one elongated slot for receiving one or more registration pins for registering the image forming and light sensitive sheets. At least one deformable resilient pressure element in the slot is deformable to bias the sheets toward the glass panel.

20 Claims, 5 Drawing Sheets

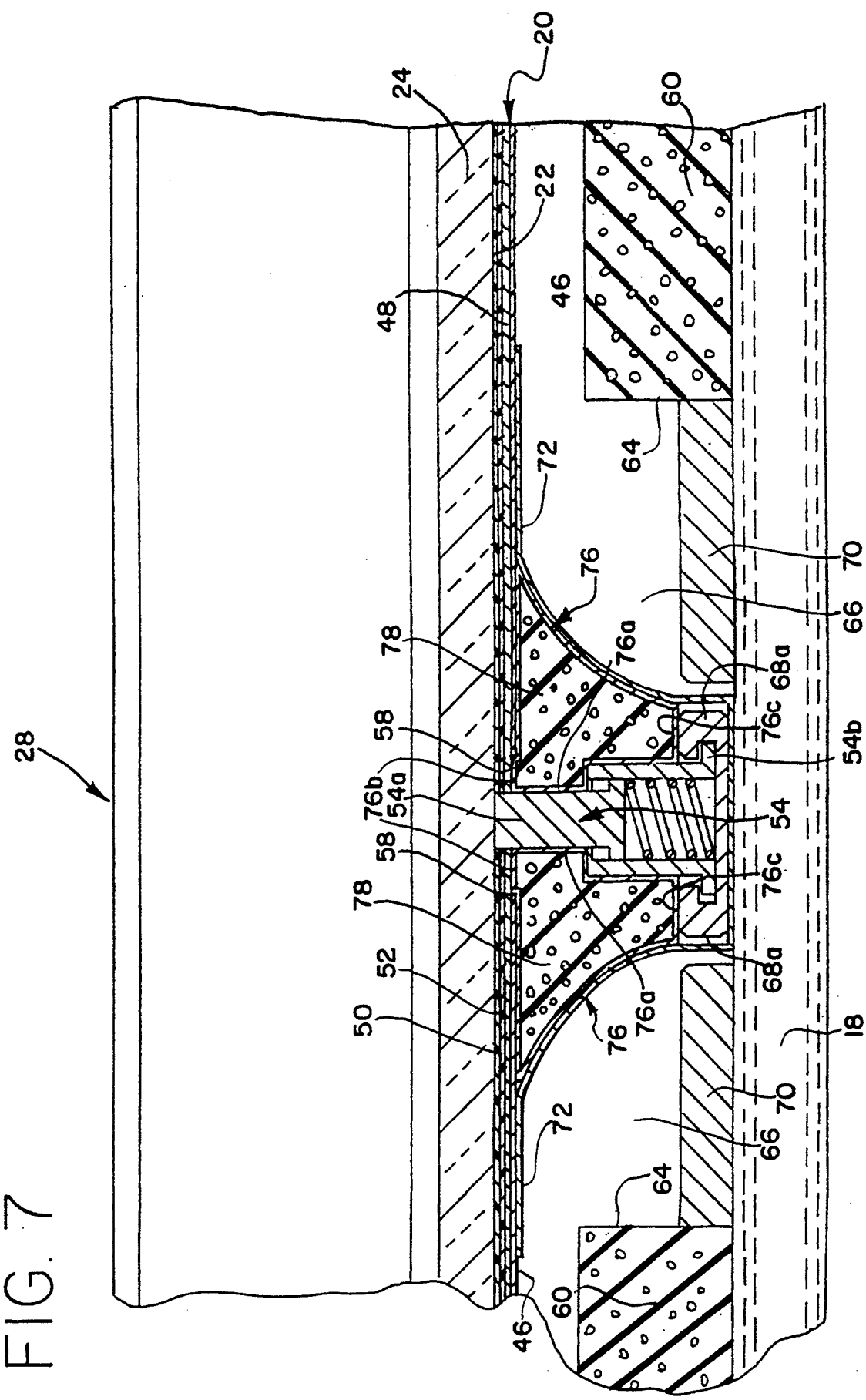

VACUUM BLANKET FOR PIN REGISTRATION

BACKGROUND OF THE INVENTION

1. Field of the Invention

The present invention relates to a new and improved vacuum blanket adapted for pin registration and maintaining precise registration between an image sheet and a light sensitive sheet for reproduction of copies of the image sheet.

More particularly, the invention pertains to a new and unique vacuum blanket apparatus generally including a flexible vacuum blanket for biasing an image sheet and a light sensitive sheet toward a planar surface of a glass panel. The vacuum blanket is adapted for pin registration of the image sheet and the light sensitive sheet. The flexible blanket is formed with an elongated slot to accommodate a registration pin. Deformable pressure elements are carried in the blanket to fill the slot and bias the sheets toward the glass panel.

The vacuum blanket apparatus of the present invention is an improvement over the vacuum blanket and the registration pin system shown and described in U.S. Pat. Nos. 4,935,773; and 4,967,230 which patents are incorporated herein by reference.

2. Background of the Prior Art

U.S. Pat. Nos. 4,967,230 and 4,935,773 disclose a registration system for light exposure apparatus and a vacuum blanket, respectively, which have been successful in producing high quality images at high production rates on an economic and efficient basis.

OBJECTS OF THE INVENTION

It is an object of the present invention to provide a new and improved vacuum blanket adapted for pin registration and maintaining precise registration between an image sheet and a light sensitive sheet for reproducing copies.

Another object of the invention is to provide a new and improved vacuum blanket capable of handling sheets of many different sizes for reproducing copies in a fast and efficient manner at relatively low cost.

Still another object of the present invention is to provide a new and improved vacuum blanket wherein graphic arts materials are not disturbed and remain virtually motionless relative to each other so that precise registration is maintained during reproduction of copies.

Still another object of the present invention is to provide a new and improved vacuum blanket adapted for using a registration pin supporting guide rail with at least one registration pin freely movable in the rail universally to accommodate sheets of different sizes.

Yet another object of the present invention is to provide a new and improved vacuum blanket including deformable pressure elements that exert holding forces to bias a registration pin support rail in a downward direction for reducing concentrated pressure from the registration pins on the glass panel.

Yet another object of the present invention is to provide a new and improved vacuum blanket including a flexible blanket having a registration slot aligned with a pin support rail and a deformable pressure element for filling the slot and biasing the image and light sensitive sheets against the glass panel.

Another object of the invention is to provide a new and improved vacuum blanket incorporating a universal registration pin system to provide graphic arts original and unexposed film materials with positional registration without requiring an auxiliary register pin board.

BRIEF SUMMARY OF THE PRESENT INVENTION

The foregoing and other objects of the present invention are accomplished in a new and improved vacuum blanket for maintaining precise registration between an image forming sheet and a light sensitive sheet when subjected to controlled exposure to light passing through a glass panel. The apparatus includes a light transmitting glass panel having a planar face for contact with the image sheet and a vacuum blanket including a blanket or cover of flexible sheet material adapted to contact the light sensitive sheet for biasing the same and said image sheet toward the planar face of the glass panel which is in a locked position parallel to the vacuum blanket. The blanket is formed with at least one elongated slot for receiving one or more registration pins for registering the image forming and light sensitive sheets. The vacuum blanket includes at least one deformable resilient pressure element in the slot that is deformable to bias the sheets toward the glass panel.

BRIEF DESCRIPTION OF THE DRAWINGS

For a better understanding of the present invention, reference should be had to the following detailed description taken in conjunction with the drawings, in which:

FIG. 4A is a greatly enlarged fragmentary view taken along the plane of FIG. 4 and illustrating a pair of deformable pressure elements for surrounding a registration pin;

FIG. 7 is a fragmentary cross-sectional view taken substantially along lines 7—7 of FIG. 4 in a condition operationally similar to FIG. 6.

DETAILED DESCRIPTION OF A PREFERRED EMBODIMENT OF THE INVENTION

Figure 1:
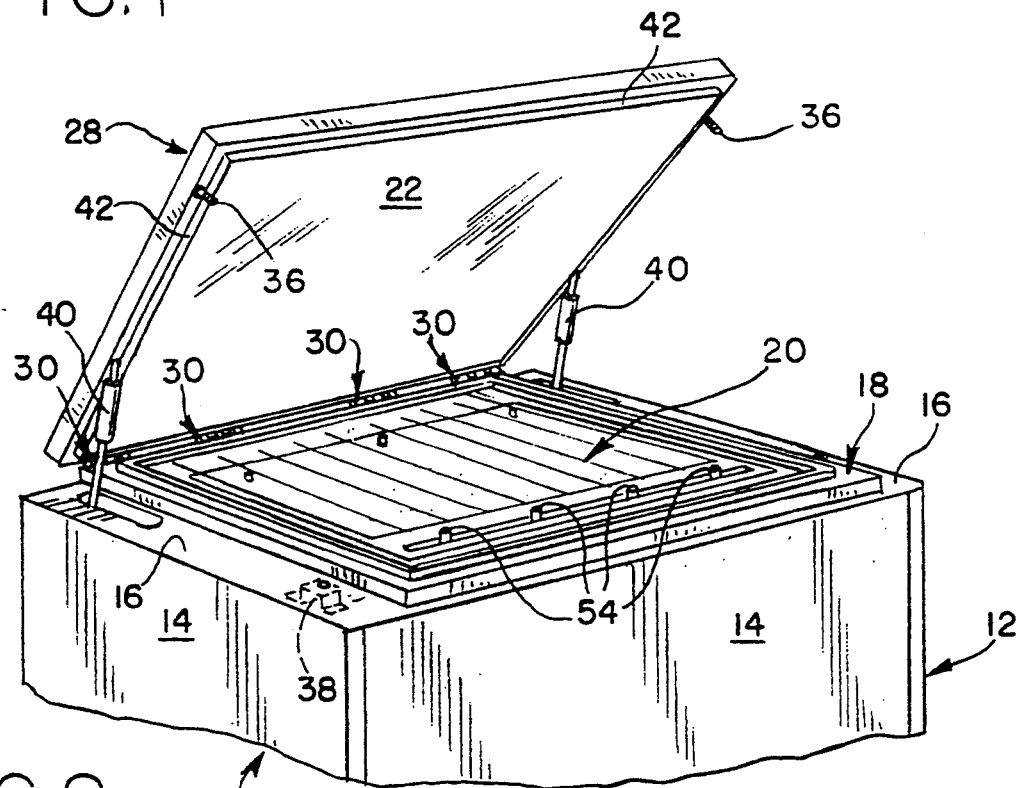
FIG. 1 is a perspective view of a new and improved vacuum frame apparatus for maintaining precise registration between an image sheet and a light sensitive sheet for reproducing copies and shown in an open position ready for loading and unloading of the sheets.

Referring now more particularly to the drawings, therein is illustrated a new and improved vacuum blanket apparatus adapted for a universal registration pin system constructed in accordance with the features of the present invention and referred to generally by the reference numeral 10. The vacuum blanket apparatus 10 is supported on a base cabinet 12, preferably formed of sheet metal and adapted to rest on the floor having vertically upstanding front, rear and side walls 14, integrally joined along an upper edge to a top wall 16.

Figure 5:
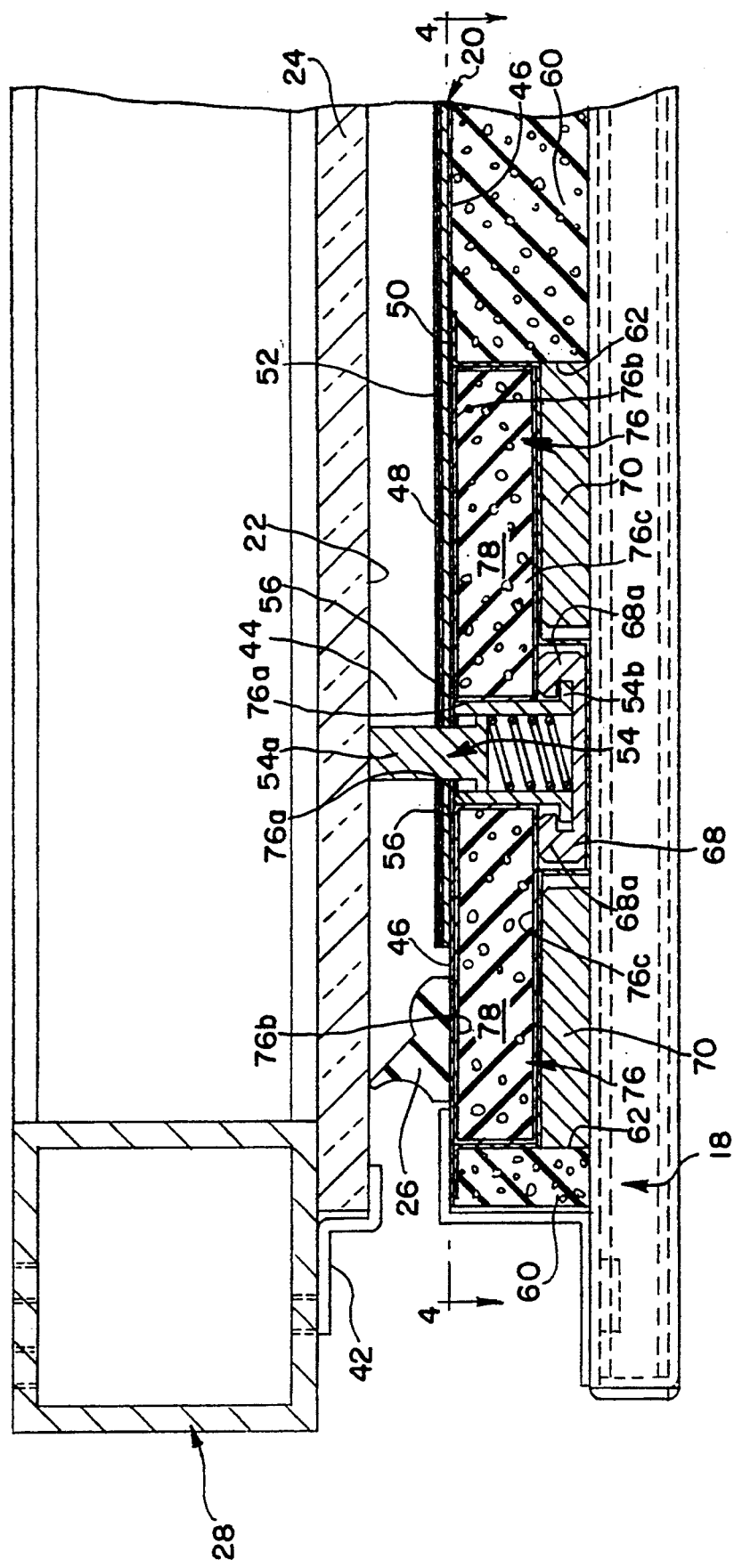
FIG. 5 is a fragmentary cross-sectional view taken substantially along lines 5—5 of FIG. 4 illustrating the apparatus with a glass panel in a closed and locked position prior to operation of the vacuum blanket for copy reproduction.
Figure 6:
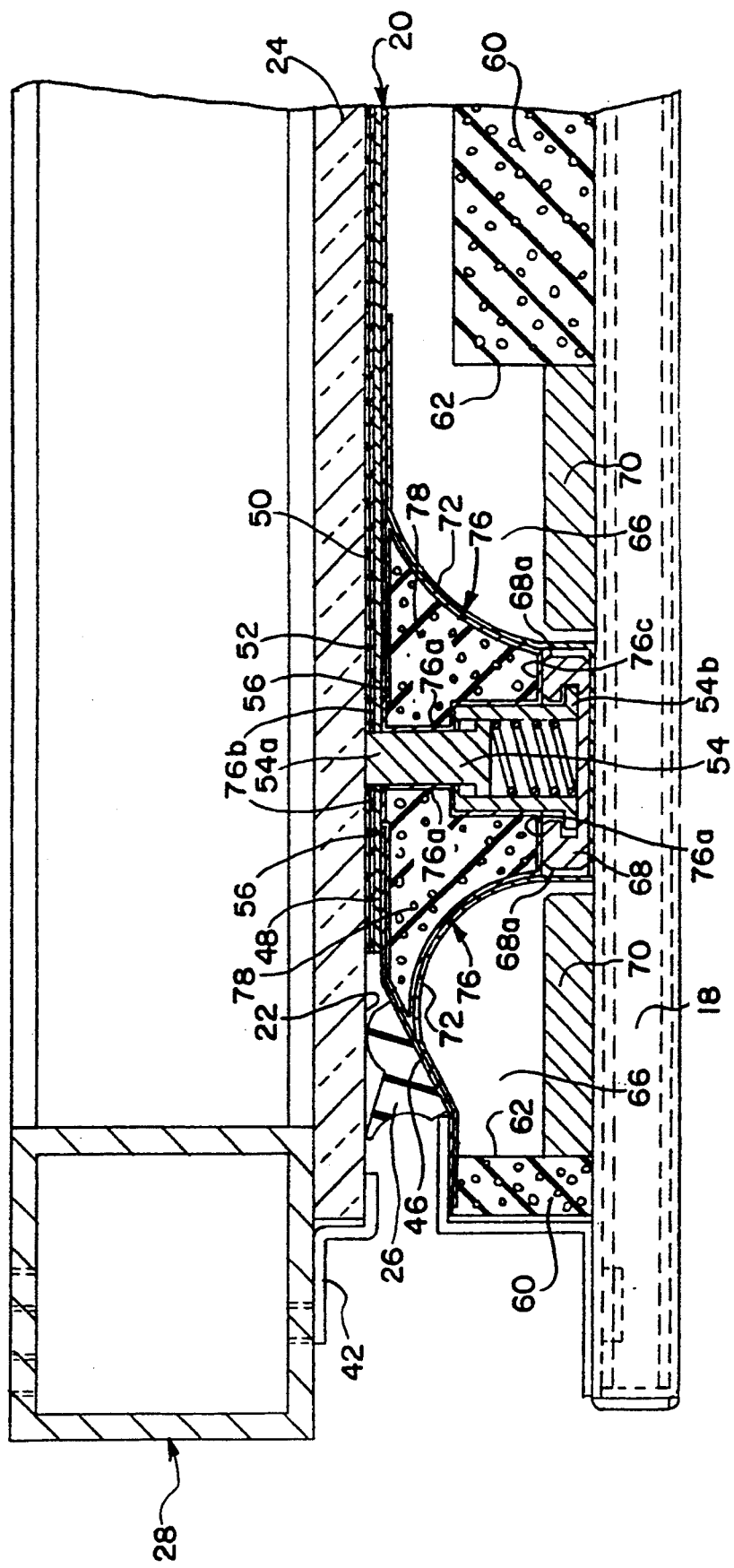
FIG. 6 is an enlarged fragmentary cross-sectional view similar to FIG. 5 but illustrating the apparatus after the vacuum blanket is in operation for biasing the sheets toward the glass panel for reproduction of an image on a light sensitive sheet.

The top wall 16 forms an operating surface positioned at a convenient working level above the floor and supports a platen 18 (FIG. 4) which carries a vacuum blanket 20 thereon. The platen 18 can be stationary or supported for vertical movement perpendicular to a planar surface 22 of a glass panel 24 when the light transmitting glass panel is locked in a horizontal operating position as shown in FIGS. 5, 6 and 7.

The vacuum blanket 20 mounted on the platen 18 is adapted for establishing an airtight seal between a resilient sealing bead 26 and the planar surface 22 of the glass panel 24, which panel is mounted on a rectangular peripheral support frame 28. The glass supporting frame 28 is of rectangular shape and formed of hollow metal tubing such as aluminum to provide a strong but lightweight structure.

Figure 2:
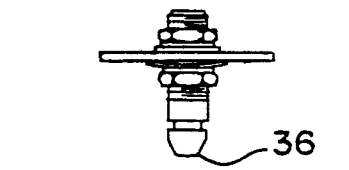
FIG. 2 is a fragmentary side elevational view of the apparatus of FIG. 1.
Figure 3:
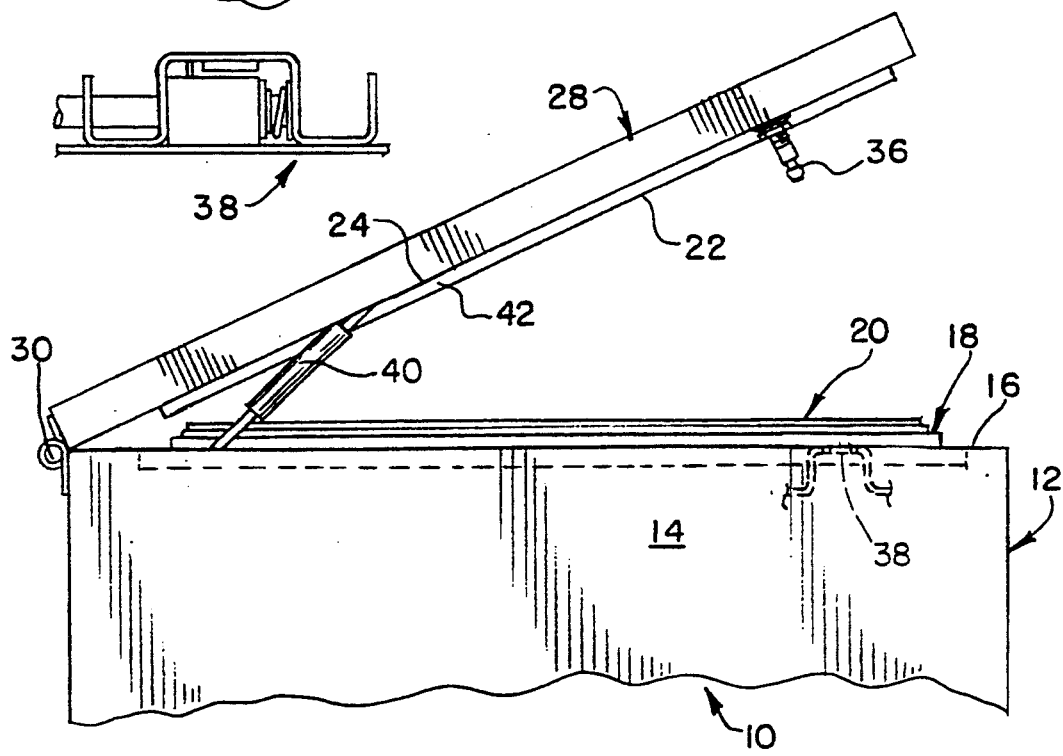
FIG. 3 is an enlarged detailed view illustrating the cooperating latching members of the apparatus of FIG. 1.

As shown in FIGS. 1 and 2, the glass frame 28 is supported for pivotal movement about a horizontal pivot axis extended along a rear edge of the frame on pivot axles 30 along the back wall 14 of the base cabinet 12 at rearward corners. Along opposed side edges of the glass frame 28 there are provided a pair of latch members 36 adapted to engage a pair of corresponding fixed latch elements 38 mounted below opposed edge portions of the marginal edge portion of the cabinet side walls 14. The cooperating latch members 36 and 38 provide a convenient arrangement for locking edge portions of the glass frame 28, which frame is pivotal between an upwardly tilted open position as shown in FIGS. 1 and 2 and a closed, horizontal, operating position (FIGS. 5, 6 and 7). The latch members 36 are adapted to latchingly engage the fixed latch elements 38 for securing and locking the glass frame 28 in spaced apart parallel relation above the vacuum blanket 20 on the platen 18. The latch member 36 and cooperating latch element 38 are shown in FIG. 3. A plunger type latch and a solenoid controlled type keeper can be used for the latch member 36 and the cooperating latch element 38, as shown.

When the glass frame 28 is pivoted upwardly into an open position as shown in FIGS. 1 and 2, the frame is maintained in the open position by a pair of gas springs 40 in readiness for easy loading and unloading of sheet materials onto the upper face of the vacuum blanket 20. The gas springs 40 have upper ends pivotally connected to side members of the glass frame 28 and lower ends pivotally supported from the base cabinet 12. The glass panel 24 is secured to a lower surface of the glass frame 32 by elongated frame elements 42 or clips which can be detached if it is necessary to repair or replace the light transmitting glass panel 24 because of damage or breakage.

In accordance with the present invention, the vacuum blanket 20 generally comprises an improved version of a vacuum blanket of the type shown and described in the aforementioned U.S. Pat. No. 4,935,773, incorporated herein by reference, and the vacuum blanket 20 generally operates in a somewhat similar manner. The vacuum blanket 20 includes an upper cover or blanket 46 of thin, flexible, fluid impervious sheet material on which is carried an insert sheet 48 for supporting a sheet of light sensitive material 50 and an image forming sheet 52 placed thereon for providing images to be reproduced when the sheets are biased upwardly toward the planar surface 22 of the glass panel 24 by operation of the vacuum blanket 20.

The image sheet 52, light sensitive sheet 50 and insert sheet 48 have punched openings aligned with one another to accommodate body portions 54a of one or more metal registration pins 54 for maintaining precise registration between all of the sheets as the vacuum blanket 20 operates during the reproduction process. One of the problems encountered in prior art registration pin systems is the fact that registration pins of many different sizes and types of pins are commonly used, and the spacing between pins varies widely as does the number and location of pins for different sizes of sheets.

The vacuum blanket apparatus 10 of the present invention eliminates these problems by facilitating the use of a universal system wherein different sizes and types of pins may be used and moved as necessary to provide the desired spacing and location. In fact, the need for an auxiliary register pin board for supporting the registration pins in a fixed or predetermined pattern is entirely eliminated by the present invention.

Figure 4:
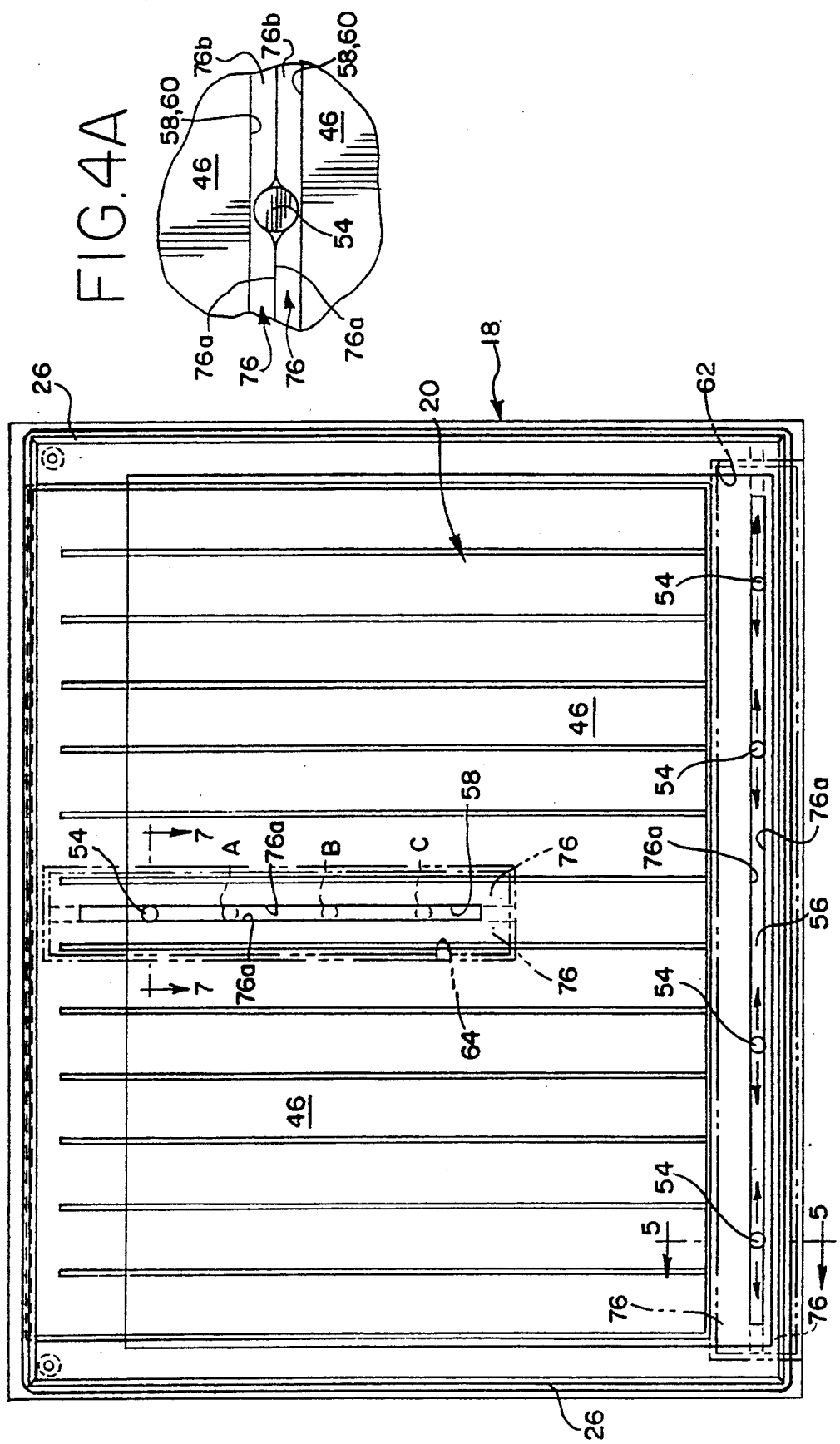
FIG. 4 is a horizontal cross-sectional view taken substantially along lines 4—4 of FIG. 5.

The upper blanket 46 is formed with a pair of elongated slots 56 and 58 to accommodate the body 54a of the registration pins 54 which are movable along the slots as indicated by the arrows in FIG. 4 to selected locations therein, as for example the positions indicated by lines A, B or C along the slot 58. The base slot 56 extends along a front edge portion of the flexible blanket 46 and accommodates a plurality of pins 54 movable along the slot to accommodate sheets of various large and small sizes as required. The centerline slot 58 runs perpendicular to the slot 56 and is positioned in line with the center of the blanket 46 and the slot 58. Thus the sheets 48, 50 and 52 regardless of dimensional size can be maintained in precise registration with a single pin 54 in the center slot 58 and preferably a plurality of pins 54 in the slot 56. The slots 56 and 58 have a width dimension that is large enough to accommodate pins 54 of the largest size likely to be encountered, and the size, type, number of pins and the spacing therebetween can be varied as dictated by the punched openings in the sheets themselves. The slots 56 and 58 have lengths that are largely dictated by the maximum size of the sheets that will be used in the apparatus 10.

The vacuum blanket 20 rests on a foam board 60 mounted on the upper surface of the platen 18 and the foam board is formed with a plurality of slots 62 and 64 directly below and aligned with the respective slots 56 and 58 in the flexible blanket 46. The foam board slots 62 and 64 are considerably wider than the slots 56 and 58 and centered with respect thereto in order to form recesses 66 beneath the flexible blanket 46 where the bladder pockets which are part of blanket 46 fit, in which pockets are mounted elongated register pin rails 68 formed of metal and adapted to slidably support enlarged bases 54a of the register pins 54 mounted in the respective rails 68. The register pin rails 68 have grooved opposite edge portions 68a extending laterally outwardly of the pins 54 to accommodate enlarged diameter pin bases 54b slidably disposed in the grooves thereof.

In each recess 66 on opposite sides of the pin rail 68, there are provided a pair of elongated pin pocket support plates 70 and a sheet of thin, flexible, fluid impervious sheet material 72 having opposite edge portions is sealingly joined to the underside of the blanket 46 on opposite sides of each slot 56, 58 and is extended across the slot to overlie the support plates 70 and pass below the center pin rail 68. The sheet material 72 forms a deformable bladder pocket positioned on opposite sides and around the ends of the register pin rail 68 within each slot 56, 58 below the flexible blanket 46. When the vacuum blanket 20 is in operation, air is evacuated from space 44, FIG. 5. Ambient air pressure causes the upper wall of sheet material 72 to deflect upwardly as shown in FIGS. 6 and 7. Upon release of vacuum in space 44 (FIG. 5), the sheet material 72 returns to the position shown in FIG. 5 resting on the upper surfaces of the support plates 70.

In accordance with the present invention, the vacuum blanket 20 includes a pair of elongated, pressure deformable, bag-like pressure elements 76 in each of the pockets formed by sheet material 72 on opposite sides of and above the registration pin rails 68 below the respective slots 56 and 58 in the upper blanket 46 and above the flexible bladder wall 72. The pressure elements 76 comprise a generally rectangular-shaped, sealed enclosure formed with an outer wall of thin, strong, flexible sheet material and filled with a compressible foam filler 78 and air or other compressible fluid. In a normal or non-deformed condition, each pressure element 76 has a generally rectangular cross-section as shown in FIG. 5 and a bottom wall 76c thereof rests on one of the sides of bladder wall 72 and an adjacent edge flange 68a of the associated pin rail 68. The facing wall portions 76a offer no substantial resistance to movement of the pins 54 along the slots 56 and 58 to any desired location on a supporting pin rail 68.

When the vacuum blanket 20 is energized to operate, the pressure exerted by the flexible bladder wall 72 causes the sealed elongated pressure elements 76 to deform in shape from the generally rectangular cross-sectional shape of FIG. 5 to the cross-sectional shape shown in FIGS. 6 and 7. As this deformation takes place, narrow edge portions 76b on the upper wall portion of the pressure element move upwardly to fill the slots 56, 58 in the flexible blanket 47 for biasing overlying portions of the sheets 48, 50 and 52 above the slots in a direction upwardly toward the glass panel surface 22. At the same time, the facing edge portions 76a of each pair of pressure elements 76 move into contact against one another as shown in FIG. 4A. It should be noted that this later action takes place on opposite sides of each registration pin 54 and extends along the centerline of each slot 56, 58 in opposite directions, thereby surrounding pin 54 that has been provided in a selected position, such as positions A, B or C, etc. within the slot as shown in FIG. 4. At the same time, lower wall portions 76c of the pressure elements 76 press downwardly on the base flanges 68a of the pin rails 68 thus relieving any excessive, closely concentrated upward pressure of a pin body 54a against the glass surface 22.

After an image has been formed on a light sensitive sheet 50 in the apparatus 10 by controlled exposure to light passed through the glass panel 24 and the image forming sheet 52, the air pressure in space 44 (FIG. 5) is increased to an ambient level and the internal foam fillers 78 in the pressure elements 76 return the elements to the original shape as shown in FIG. 5 wherein the transverse cross-sections again become generally rectangular in shape. As the pressure elements 76 return to the original rectangular cross-sectional shape, the upper wall portions 76b along the edge walls 76a retract downwardly away from the insert sheet 48 and the lower wall 76c again rest on the sides of bladder pocket 72.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A vacuum blanket apparatus for maintaining precise registration between a light sensitive sheet and an image forming sheet placed in covering relation thereon for controlled light exposure for reproducing said image, comprising:

a vacuum blanket assembly including a blanket of thin flexible sheet material for biasing said sheets toward a planar surface and having an elongated slot therein;

a light transmitting, rigid panel defining said planar surface for transmitting light to said image forming sheet in contact therewith for reproducing said image on said light sensitive sheet;

rigid platen means in spaced parallel relation with said panel for supporting said vacuum blanket thereon during reproduction of said image;

registration means in said elongated slot for registering said sheets; and bladder means in said slot deformable under pressure for biasing said sheets toward said panel.

2. The vacuum blanket apparatus of claim 1, including:

elongated guide rail means aligned with said slot between said vacuum blanket assembly and said platen for securing one or more registration pins for slidable movement along an axis of said slot and guide rail means to a selected position thereon; and at least one registration pin mounted in said guide rail means including a pin body adapted to extend through aligned registration openings formed in said respective sheets and said elongated slot formed in said blanket.

3. The vacuum blanket apparatus of claim 2, wherein: said bladder means is engageable with said guide rail means for biasing the same toward said platen.

4. The vacuum blanket apparatus of claim 1, including:

bladder pocket means for deforming said bladder means to engage said blanket along said slot.

5. The vacuum blanket apparatus of claim 1, wherein: said bladder means includes an outer jacket of thin flexible sheet material.

6. The vacuum blanket apparatus of claim 1, wherein: said bladder means includes an enclosure formed by said flexible jacket filled with compressible cellular foam material.

7. The vacuum blanket of claim 5, wherein: said outer jacket is formed into a sealed enclosure containing a compressible fluid.

8. The vacuum blanket of claim 7, wherein: said compressible fluid comprises air at substantially atmospheric pressure when said bladder pocket means is not exerting biasing force against said bladder means.

9. The vacuum blanket of claim 1, wherein: said bladder means includes at least one pair of flexible, pressure exerting elements on opposite sides of said axis of said slot.

10. The vacuum blanket of claim 1, wherein:

said bladder elements include confronting surfaces engaging each other along said slot when deformed under pressure.

11. The vacuum blanket of claim 10, wherein:
said confronting surfaces engage said pin body on opposite sides when bladder elements are deformed under pressure.

12. The vacuum blanket of claim 11, wherein:
said confronting surfaces are movable apart permitting movement of said pin along said axis of said slot when said bladder elements are not deformed under pressure.

13. A vacuum blanket for biasing an image forming sheet in registration with a light sensitive sheet toward a planar surface of a light transmitting panel, comprising:
   a blanket of thin flexible sheet material for supporting said sheets and formed with an elongated slot therein;
   platen means for supporting said vacuum blanket in spaced apart parallel relationship with said panel; and
   deformable bladder means in said slot for biasing said sheets toward said panel.

14. The vacuum blanket of claim 13, including:
   rail means supported on said platen means extending along said slot; and
   at least one registration pin mounted for sliding movement along said rail means and said slot and adapted to project into said slot and registration openings provided in said sheets.

15. The vacuum blanket of claim 14, wherein:
said deformable bladder means is positioned to bias said rail means toward said platen means.

16. The vacuum blanket of claim 14, including:
bladder pocket means for deforming said bladder means to engage said blanket along said slot.

17. The vacuum blanket of claim 13, wherein:
said bladder means includes a flexible outer jacket forming a sealed fluid containing enclosure.

18. The vacuum blanket of claim 17, wherein:
said enclosure contains compressible cellular foam.

19. The vacuum blanket of claim 17, wherein:
said bladder means includes a plurality of said fluid containing enclosures extending along said slot on opposite sides of a longitudinal axis thereof adapted to engage one another along said axis and extend in opposite directions from said pin.

20. The vacuum blanket of claim 19, wherein:
said enclosures are movable away from engagement along said axis for permitting movement of said pin along said rail means.

* * * * *